Nov. 19, 1968  W. J. KATZ  3,411,760
TOP-INSIDE PRESSURE TANK DISTRIBUTOR
Filed Feb. 10, 1966
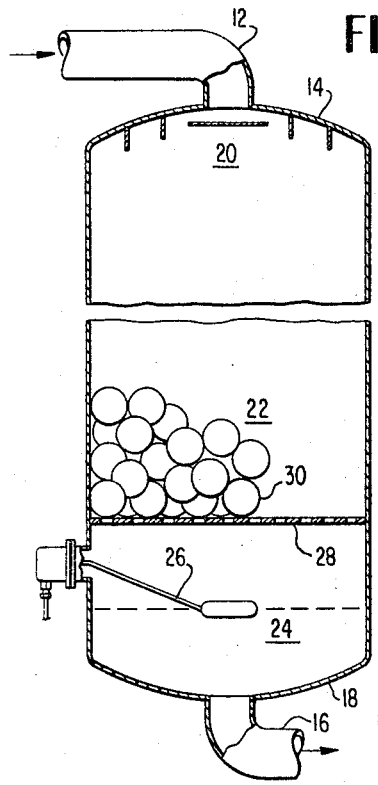
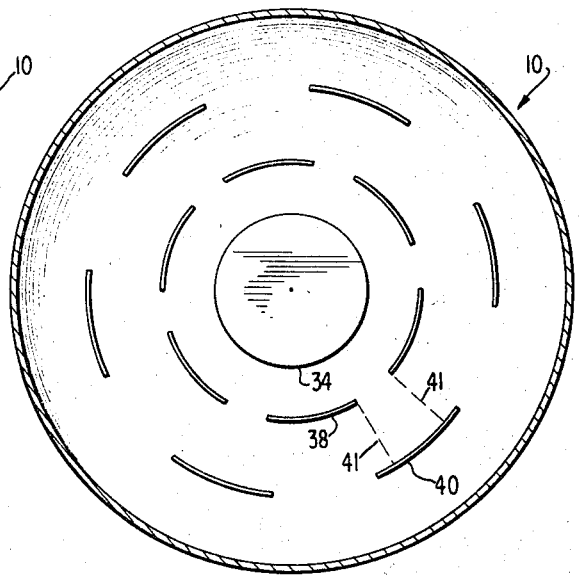
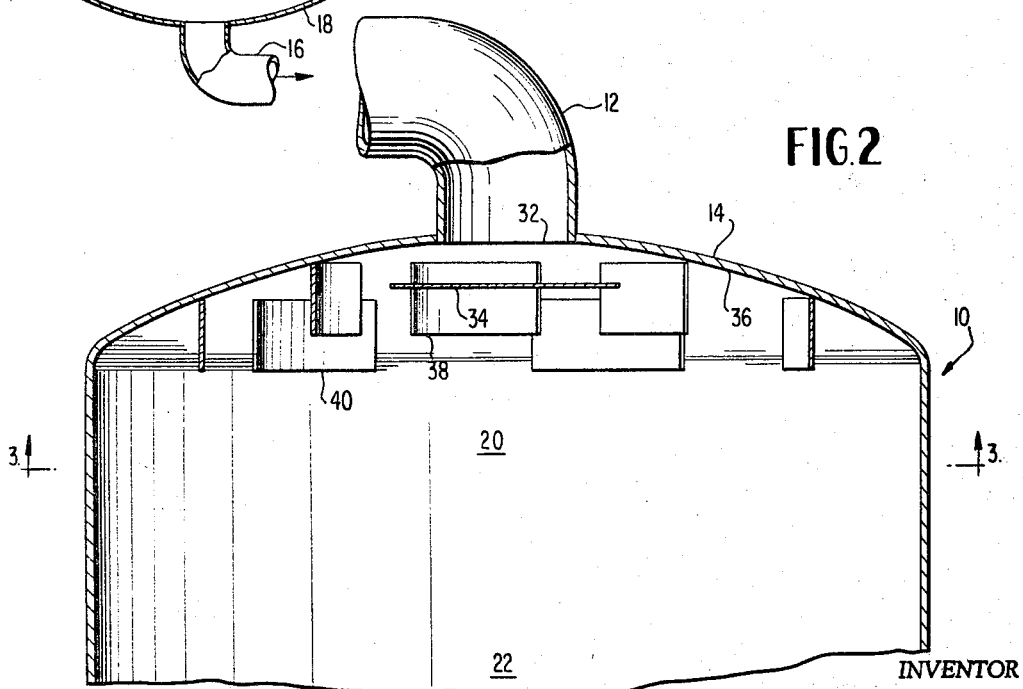
INVENTOR
WILLIAM J. KATZ
BY *Sughrue, Rothwell, Mion, Zinn & Macpeak*
ATTORNEYS United States Patent Office 3,411,760
Patented Nov. 19, 1968

3,411,760
TOP-INSIDE PRESSURE TANK DISTRIBUTOR
William J. Katz, Fox Point, Wis., assignor to Rex Chainbelt Inc., Milwaukee, Wis., a corporation of Wisconsin
Filed Feb. 10, 1966, Ser. No. 526,486
4 Claims. (Cl. 261—98)

ABSTRACT OF THE DISCLOSURE

A distribution system for gas and liquid in a gas absorption tank having a central liquid inlet opening directed downwardly through the top of the tank includes a fixed baffle spaced downwardly from the opening to direct liquid horizontally along an inverted concave surface and a series of discontinuous arcuate baffles are fixed to the concave surface to intercept portions of the liquid and to form separate falling streams in the tank.

---

This invention relates to improvements in the distribution of a gas and liquid introduced under pressure into a tank, particularly a tank arrangement used for gas absorption having a series of baffles over which the liquid flows to absorb the gas contained within the tank.

In my prior Patent 2,888,091 granted May 26, 1959, I disclose a gas absorption apparatus, including means for dissolving a gas in a liquid and releasing the same in a tank. The tank has an upper zone for receiving the gas mixed with the liquid under pressure, an intermediate zone through which the liquid and gas flows by gravity to absorb gas contained in a tank and a lower zone in which liquid is retained with some gas dissolved therein.

Quite often the liquid input in addition to having gas dissolved therein includes materials which can clog the usual distributing means between the upper inlet zone and intermediate zone. Such known distributing means (e.g. perforate pan 11 in Patent 2,888,091) can become readily clogged by grease or with rags, sticks and the like. This invention provides a distributing means for the liquid inlet which will distribute the flow evenly for free fall or over any packing material desired. The essential feature being that the liquid inlet is divided up into the optimum number of separate streams to pass through the intermediate zone and provide maximum interfacial area between the liquid and air and maximum rate of dissolution of air. This is accomplished by providing a target baffle immediately below a central liquid inlet, an inverted concave surface conforming to the normal flow trajectory of the liquid off the target baffle, and arcuate baffles positioned concentrically of the liquid inlet to intercept given segments of flow to form the separate streams.

Other objects of the invention will be pointed out in the following description and claims and illustrated in the accompanying drawings, which disclose by way of example, the principle of the invention and the best mode which has been contemplated of applying that principle.

In the drawings:

FIG. 1 is a central vertical section of one form of pressure tank suitable for use with this invention and showing the fluid inlet distribution means of this invention positioned therein;

FIG. 2 is an enlarged vertical sectional view of the top zone of the tank shown in FIG. 1 illustrating in more detail the liquid distribution arrangement; and FIG. 3 is a sectional view taken along line 3—3 of FIG. 2.

Referring to the drawings, there is shown in FIG. 1 a closed pressure tank 10 suitable for containing fluids under pressure and having connected thereto an inlet pipe 12 entering into top 14 of the tank and an outlet pipe 16 exiting from bottom 18 of the tank.

The tank is of the type to facilitate the solution of air into the pressurized flow and as such includes an upper zone 20 where the liquid and air are introduced under pressure, an intermediate zone 22 through which the liquid flow is by gravity, and a lower zone 24 for retaining a quantity of the liquid with air dissolved therein.

The tank is of the packed type in the illustrated example but this invention is equally applicable to the packless type. The packed type of tank illustrated includes a liquid level control float arrangement of the type described in Patent 2,888,091, positioned below a grate 28 carrying thereon non-absorbent pieces of inert material 30 to provide a means for saturating the pressurized flow with air.

FIGS. 2 and 3 illustrate best the fluid inlet distributing means which constitutes this invention. Inlet pipe 12 flows into the tank 10 through a central opening 32 and is directed downwardly against a fixed, circular target baffle 34. Baffle 34 is slightly larger in diameter than the diameter of opening 32 and positioned a controlled distance therebelow. The underside 36 of tank top 14 is of an inverted concave shape which corresponds with the trajectory of the liquid flowing in all horizontal directions from target baffle 34 so that the liquid is held against underside 36 by its inertia or tendency to move in a straight line except for the effect of gravity. To divide such flow into a number of streams as described, there is provided a baffle arrangement including an inner ring of arcuate baffles 38 and an outer ring of arcuate baffles 40.

The arrangement of the baffles is quite important to obtaining optimum results. The baffles 38 are positioned concentrically with the opening 32 and target baffle 34, as are the outside ring of baffles 40. The baffles 38 are evenly spaced from each other and the area between the ends of the baffles provides an opening for the normal trajectory liquid to extend out further where it is intercepted by the outer ring of baffles 40. This arrangement provides for the maximum distribution of liquid over the area of the tank as the liquid falls through the intermediate zone and divides the streams so as to provide for maximum interfacial area between the liquid and air and consequently the optimum rate of solution of air into the water. In the illustrated embodiment there are six spaced arcuate baffles in each ring and the angle defined between the center of the tank and the openings of the baffles 38 is twenty degrees, while the angle subtended by the outer baffles 40 is thirty degrees overlapping the twenty degree opening by five degrees on each side. The additional angle subtended by baffles 40 is required because the flow directed at each baffle 40 is unconfined at its edges and tends to spread horizontally over the underside 36 as shown by the broken lines 41 in FIG. 3. The baffles 38 and 40 are arranged so that no sticks or rags can possibly become lodged in the tank where they will interfere with the distribution of the incoming liquid. The baffles also remain effectively clear of grease which will accumulate in other distribution means and will require more frequent cleaning of the tank.

While the invention has been particularly shown and described with reference to a preferred embodiment thereof, it will be understood by those skilled in the art that various changes in form and details may be made therein without departing from the spirit and scope of the invention.

What is claimed is:

1. In a closed tank having an upper zone for receiving air and liquid under pressure, an intermediate zone through which the liquid flows by gravity and a lower zone with means for retaining a quantity of the liquid with air dissolved therein; a liquid inlet pipe connected to the top of the tank and having a central opening directed downwardly into said upper zone, means for admitting air to the tank, a fixed horizontal baffle spaced beneath said opening to direct the liquid therefrom in all horizontal directions, structural means within the tank defining about said opening an inverted concave surface conforming with and disposed to define the trajectory of the liquid, so the liquid directed by the baffle flows along the concave surface and a series of discontinuous arcuate baffles fixed to said means and extending downwardly from said surface to intercept given segments of said flow to form separate streams falling through said intermediate zone, said baffles being concentric respecting said opening whereby the flow is equally divided into the several streams so as to provide a maximum interfacial area between the liquid and air and the optimum rate of absorption of air.

2. In a tank as defined in claim 1 wherein the effective horizontal dimensions of the arcuate baffles are approximately proportional to their distances from the fixed horizontal baffle.

3. A tank as defined in claim 1 wherein there are at least two concentric rings of arcuate baffles with the baffles of each ring equally spaced from each other and openings between ends of baffles in the inner ring allowing a stream of liquid to be directed out to be intercepted by baffles in the outer ring which are positioned radially outward of the openings between the ends of baffles in the inner row.

4. In a tank as defined in claim 3 the arrangement wherein there are six arcuate baffles in both the inner ring and outer ring and the opening between the ends of the baffles in the inner ring defines an arc of twenty degrees, while each baffle in the outer ring defines an arc of thirty degrees.

References Cited

UNITED STATES PATENTS

| | | | |
|---|---|---|---|
| 428,954 | 5/1890 | Robertson | 55—442 XR |
| 876,347 | 1/1908 | Hageman et al. | 55—441 XR |
| 979,211 | 12/1910 | Serrell | 261—115 XR |
| 2,428,922 | 10/1947 | Shoresman | 261—110 XR |
| 2,452,716 | 11/1948 | Bergquist | 55—201 XR |
| 2,888,091 | 5/1959 | Katz | 55—164 |
| 3,006,623 | 10/1961 | Ross et al. | 261—110 |

HARRY B. THORNTON, *Primary Examiner.*

TIM R. MILES, *Assistant Examiner.*